United States Patent [19]

Feldhues

[11] Patent Number: 5,098,529

[45] Date of Patent: Mar. 24, 1992

[54] ELECTROCHEMICAL PROCESS FOR THE PRODUCTION OF ELECTRICALLY CONDUCTING POLY(ALKOXYTHIOPHENES) WITH CARBOXYLIC ACIDS ADDED

[75] Inventor: Michael Feldhues, Bad Soden am Taunus, Fed. Rep. of Germany

[73] Assignee: Hoechst Aktiengesellschaft, Frankfurt, Fed. Rep. of Germany

[21] Appl. No.: 577,927

[22] Filed: Sep. 5, 1990

[30] Foreign Application Priority Data

Sep. 7, 1989 [DE] Fed. Rep. of Germany ....... 3929690

[51] Int. Cl.$^5$ .............................................. C25B 3/00
[52] U.S. Cl. ..................... 204/59 R; 204/78; 252/500
[58] Field of Search ................ 204/59 R, 78; 252/500

[56] References Cited

U.S. PATENT DOCUMENTS

| | | | |
|---|---|---|---|
| 4,536,262 | 8/1985 | Wegner et al. | 204/78 |
| 4,547,270 | 10/1985 | Naarmann | 204/59 R |
| 4,749,451 | 6/1988 | Naarman | 204/59 R |

FOREIGN PATENT DOCUMENTS 0257573  3/1988  European Pat. Off. .

OTHER PUBLICATIONS

Chemical Patent Index, Documentation Abstracts Journal, Section A, Polymers, Derwent Publications Ltd., London, GB; AN=89-073459 & JP-A-1026648 (Agency of Ind. Sci. Tech.) 890127.

*Primary Examiner*—John F. Niebling
*Assistant Examiner*—Steven P. Marquis
*Attorney, Agent, or Firm*—Curtis, Morris & Safford

[57] ABSTRACT

Electrochemical process for the production of electrically conducting poly(alkoxythiophenes) with carboxylic acids added.

Poly(alkoxythiophenes) are of great interest as electrically conducting polymers as a result of their high stability towards air and water and as a result of their good temperature resistance.

Suitable for the production of such polymers on an industrial scale is an electrochemical process for the production of electrically conducting poly(alkoxythiophenes) in which the protons needed for the cathode process are made available by adding carboxylic acids to conducting salt and electrolyte solvent. The counterions in the doped polymer originate from the conducting salt, with the result that the properties of the polymer are substantially independent of the proton source.

7 Claims, No Drawings

ELECTROCHEMICAL PROCESS FOR THE PRODUCTION OF ELECTRICALLY CONDUCTING POLY(ALKOXYTHIOPHENES) WITH CARBOXYLIC ACIDS ADDED

The invention relates to an improved process for the electrochemical production of electrically conducting poly(alkoxythiophenes) which takes into consideration requirements for production on an industrial scale.

Poly(alkoxythiophenes) are of special interest among the electrically conducting polymers since they have high stability in relation to air and water and good temperature resistance. In addition the poly(alkoxythiophenes) include a number of representatives which are soluble in the doped state and consequently make possible conductive coatings on various substrates.

The electrochemical anodic oxidation of alkoxythiophenes is a known method of producing electrically conducting poly(alkoxythiophenes) (cf. EP-A 257,573). However, little attention has hitherto been paid to the cathode process, which acquires increasing importance in electrolyses as conversion increases. In addition, the tetraalkylammonium salts preferably used as conducting salts are relatively expensive and cannot be completely recovered since a portion is decomposed during the electrolysis.

In a functioning electrochemical cell different electrochemical reactions take place at the same time at the anode and at the cathode. Thus, for example, in the electrochemical polymerization of thiophene, monomeric thiophene gradually reacts to form polythiophene at the anode with two protons being detached per monomer unit, while at the cathode, protons are reduced in the normal manner to hydrogen. During the anodic polymerization of thiophene, the polythiophene formed is additionally still further oxidized at the anode to form doped polythiophene, one positive charge in general being missing for every three to five monomer units. In this case, the stoichiometry of the individual reactions has the following appearance:

Anode:

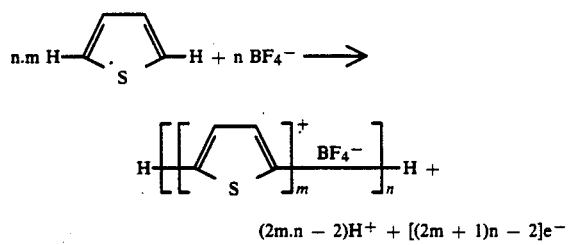

Cathode:

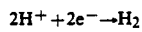

For each electron which is detached from the monomeric or polymeric thiophene and flows into the anode, an electron has to leave the cathode and is able to discharge a proton at that point. From the stoichiometry of the anode reaction it is evident that precisely n more electrons are produced than protons. This has the inevitable result that insufficient protons are available for discharge at the cathode. In particular in preparative electrolyses with high conversion at constant current this causes a voltage increase which results in uncontrollable reactions with conducting salt and solvent which reduce selectivity and yield and, as a consequence of decomposition products from undesirable cathode processes, make the working-up of the electrolyte difficult. The increase in the pH value during the electrolysis makes itself felt in a particularly troublesome manner if the less expensive alkali-metal salts are used as conducting salts since a troublesome scale then deposits on the cathode.

An increase in the pH in the cathode space occurs to a particular extent if the transport of anodically formed protons to the cathode is impeded or entirely suppressed, for example if diaphragms and ion exchange membranes are used.

The polymerization of thiophene in the presence of sulfuric acid, which is used as "conducting salt" but is also able to make protons available, yields a usable result only at low temperatures (cf. Synthetic Metals 6, 69 (1983)). The electrolyte described, which is composed of sulfuric acid in dimethyl sulfate, is unsuitable for producing poly(alkoxythiophenes) since it causes ether splitting and alkylating crosslinking in the case of alkoxythiophenes.

The addition of Bronsted acids having a $pK_a$ value of $-1.75$ to 5 is in many cases a satisfactory solution. The anions have an appreciable effect on the properties of conducting polymers (cf. J. Polymer Sci., Pol. Phys. Ed., vol. 22, 33 (1984)). If the anion of the Bronsted acid is not the same as the conducting salt anion, there is a risk that important properties of the doped poly(alkoxythiophenes) are uncontrollably altered by the simultaneous incorporation of both anion types.

The object was therefore to develop an electrochemical process for the production of electrically conducting poly(alkoxythiophenes) which is suitable for industrial production and in which the protons needed for the cathode process are available but the required counterions in the doped polymer still originate from the conducting salt used, with the result that the properties of the polymer are substantially independent of the proton source.

It was found that carboxylic acids which are added to the required conducting salt and electrolyte solvent make available the protons additionally required for the liberation of hydrogen at the cathode without adversely affecting the properties of the polymer since the anions of the carboxylic acids used are, surprisingly, not incorporated, or only incorporated in an insignificant amount, in the polymer produced.

The present invention relates to a process for the production of an electrically conducting poly(alkoxythiophene) in the doped (oxidized) form comprising electrochemical anodic polymerization of compounds of the formula (I):

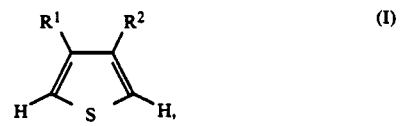

in which
$R^1$ is a straight-chain or branched $(C_1-C_{30})$alkoxy group or $-O(CH_2CH_2)_nCH_3$ where $n = 1$ to 4, and
$R^2$ is a hydrogen atom, a $(C_1-C_{12})$alkyl group, a $(C_1-C_{30})$alkoxy group or $-O(CH_2CH_2O)_nCH_3$ where $n = 1$ to 4, or $R^1$ and $R^2$ together form the radical —O(CH$_2$)$_m$CH$_2$— or —O(CH$_2$)$_m$O— where m=1 to 12, or compounds of the formula (II):

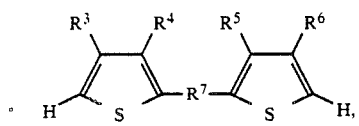 (II)

in which
at least one of the radicals $R^3$, $R^4$, $R^5$ or $R^6$ is a straight-chain or branched (C$_1$-C$_{30}$)alkoxy group or —O(CH$_2$CH$_2$O)$_n$CH$_3$ where n=1 to 4, and the remainder of the radicals $R^3$, $R^4$, $R^5$ and $R^6$ represent a hydrogen atom, a (C$_1$-C$_{12}$)alkyl group or a (C$_1$-C$_{30}$)alkoxy group, and
$R^7$ is an arylene group, a heteroarylene group or a conjugated system of the formula (CH=CH)$_p$, in which p is zero, 1, 2 or 3, or $R^3$, $R^4$, $R^5$ and $R^6$ are, independently of one another, a hydrogen atom, a (C$_1$-C$_{12}$)alkyl group or a (C$_1$-C$_{30}$)alkoxy group, and
$R^7$ is a radical of the formula (III):

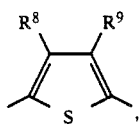 (III)

in which
$R^8$ is a straight-chain or branched (C$_1$-C$_{30}$)alkoxy group or —O(CH$_2$CH$_2$O)$_n$CH$_3$, where n=1 to 4, and
$R^9$ is a hydrogen atom, a(C$_1$-C$_{12}$)alkyl group or a (C$_1$-C$_{30}$)alkoxy group, optionally together with one or more comonomers of the formula (IV)

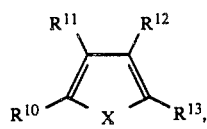 (IV)

in which
$R^{11}$ and $R^{12}$, independently of one another, are a hydrogen atom, a halogen atom, a (C$_1$-C$_{12}$)alkyl, alkoxyalkyl, arylmethyl or aryl group or, together with the carbon atoms joining them, form an aromatic ring,
$R^{10}$ and $R^{13}$, independently of one another, are a hydrogen atom or $R^{10}$ together with $R^{11}$ and the carbon atoms joining them or $R^{12}$ together with $R^{13}$ and the carbon atoms joining them each form an aromatic ring,
X is an oxygen atom, a sulfur atom, an NH group, an N-alkyl group or an N-aryl group or together with a comonomer of the formula (V)

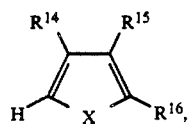 (V)

in which $R^{14}$ and $R^{15}$, independently of one another, are a hydrogen atom, a halogen atom, a (C$_1$-C$_{12}$)alkyl group, a (C$_1$-C$_{30}$)alkoxy group or a (C$_1$-C$_4$)acylamino group,
$R^{16}$ is a halogen atom, a (C$_1$-C$_{12}$)alkyl group, a (C$_1$-C$_{30}$)-alkoxy group or a (C$_1$-C$_4$)acylamino group, and
X has the meaning specified above,
in an electrolyte solvent in the presence of a conducting salt and additionally in the presence of a proton source in the form of at least one monomeric or polymeric carboxylic acid whose anions differ from the anions of the conducting salt.

The process according to the invention describes the advantageous production of doped poly(alkoxythiophenes) of compounds of the formula (I):

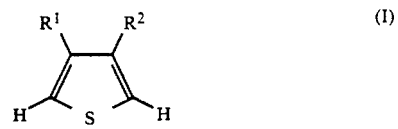 (I)

by electrochemical polymerization in the presence of an electrolyte solvent, a conducting salt and a Bronsted acid.

$R^1$ is a straight-chain or branched (C$_1$-C$_{30}$)-, preferably (C$_1$-C$_{12}$)alkoxy group and in particular a methoxy group, or —O(CH$_2$CH$_2$O)$_n$CH$_3$, where n=1 to 4, preferably 1 or 2.

$R^2$ is preferably a hydrogen atom, a (C$_1$-C$_{12}$)alkyl group, preferably a methyl group, a (C$_1$-C$_{30}$)-, preferably a (C$_1$-C$_{12}$)alkoxy group, in particular a methoxy group, or —O(CH$_2$CH$_2$O)$_n$CH$_3$, where n=1 to 4, preferably 1 or 2.

$R^1$ and $R^2$ may also form together the radical —O(CH$_2$)$_m$CH$_2$-or —O(CH$_2$)$_m$O— where m=1 to 12, preferably 1 to 4.

Examples of compounds of the formula (I) are: 3-methoxythiophene, 3-methoxy-4-methylthiophene, 3,4-dimethoxythiophene, 3-ethoxythiophene,3-ethoxy-4-methylthiophene, 3-ethoxy-4-methoxythiophene, 3-propoxythiophene, 3-butoxythiophene,3-butoxy-4-methylthiophene, 3-butoxy-4-methoxythiophene, 3-pentyloxythiophene, 3-hexyloxythiophene, 3-heptyloxythiophene, 3-octyloxythiophene, 3-nonyloxythiophene, 3-decyloxythiophene, 3-undecyloxythiophene, 3-dodecyloxythiophene, 3-tetradecyloxythiophene, 3-pentadecyloxythiophene, 3-hexadecyloxythiophene, 3-octadecyloxythiophene,3-eicosyloxythiophene, 3-docosyloxythiophene, 3-(2,-ethylhexyloxy)thiophene, 3-(2,,4,,4,-trimethylpentyloxy)thiophene,3,4-dihexyloxythiophene, 3,4-dioctyloxythiophene, 3,4-didodecyloxy-thiophene, 3-methoxy-4-pentyloxythiophene, 3-hexyloxy-4-methoxythiophene, 3-dodecyloxy-4-methoxythiophene, 3-dodecyloxy-4-methylthiophene, 3-docosyloxy-4-methoxythiophene, 3-ethoxy-4-pentyloxythiophene, 3-ethoxy-4-hexyloxythiophene, 3-butoxy-4-dodecyloxythiophene, 3-(2,-ethylhexyloxy)-4-methoxythiophene,3-(methoxyethoxy)thiophene, 3-(methoxyethoxy)-4-methylthiophene, 3- methoxyethoxyethoxy)thiophene, 3-(methoxyethoxyethoxy)-4-methylthiophene, 3-ethyl-4-methoxythiophene, 3-butyl-4-methoxythiophene, 3-dodecyl-4-methoxythiophene, 3-ethoxy-4-ethylthiophene, 3-butoxy-4-ethylthiophene, 3,4-(ethylene-1,2-dioxy)thiophene, 3,4-(prop-3-ylene-1-oxy)thiophene. Mixtures of compounds of the formula (I) may also be used.

The process according to the invention also describes the advantageous production of doped poly(alkoxythiophenes) by electrochemical polymerization of compounds of the formula (II):

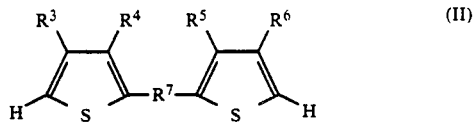

in the presence of an electrolyte solvent, a conducting salt and a carboxylic acid.

At least one of the radicals $R^3$, $R^4$, $R^5$ and $R^6$ is a straight-chain or branched $(C_1-C_{30})$alkoxy group, preferably a $(C_1-C_{12})$alkoxy group, in particular a methoxy group, or $-O(CH_2CH_2O)_nCH_3$, where $n=1$ to 4, preferably 1 or 2.

The other radicals $R^3$, $R^4$, $R^5$ and $R^6$ are preferably a hydrogen atom, a $(C_1-C_{12})$alkyl group, preferably a methyl group, or a $(C_1-C_{30})$-, preferably $(C_1-C_{12})$alkoxy group.

$R^7$ is an arylene group, preferably phenylene, a heteroarylene group, preferably thienylene, furanylene, pyrrolylene or a conjugated system of the formula $(CH=CH)_p$, in which p is zero, 1, 2 or 3, preferably zero or one.

$R^3$, $R^4$, $R^5$ and $R^6$ may also be, independently of one another, preferably a hydrogen atom, a $(C_1-C_{12})$alkyl group, preferably a methyl group, or a $(C_1-C_{30})$-, preferably a $(C_1-C_{12})$alkoxy group, in particular a methoxy group, if $R^7$ is a radical of the formula (III):

$R^8$ is a straight-chain or branched $(C_1-C_{30})$-, preferably a $(C_1-C_{12})$alkoxy group, in particular a methoxy group, or $-O(CH_2CH_2O)_nCH_3$, where $n=1$ to 4, preferably 1 or 2.

$R^9$ is a hydrogen atom, a $(C_1-C_{12})$alkyl group, preferably a methyl group, or a $(C_1-C_{30})$-, preferably a $(C_1-C_{12})$alkoxy group, in particular a methoxy group.

Examples of compounds of the formula (II) are: 3,3'-dimethoxy-2,2'-bithiophene, 3,4'dimethoxy-2,2'-bithiophene, 4,4'-dimethoxy-2,2'-bithiophene, 3,3'-dihexyloxy-2,2'-bithiophene, 4,4'-didodecyloxy-2,2'-bithiophene, 3-dodecyloxy-4'-methoxy-2,2'-bithiophene, 3,3'-dimethoxy-4,4'-dimethyl-2,2'-bithiophene, 4,4'-dimethoxy-3,3'-dimethyl-2,2'-bithiophene, 3'-methoxy-2,2':5',2''-terthienyl, 3',4'-dimethoxy-2,2':5',2''-terthienyl, 3'-methoxy-4'-methyl-2,2':5',2''-terthienyl, 4,4''-dimethoxy-2,2':5',2''-terthienyl, 3,3''-dimethoxy2,2':5',-2''-terthienyl. Mixtures of compounds of the formula (II) or mixtures of compounds of the formula (II) with those of the formula (I) may also be used.

The proportion of the compounds of the formula (I) or (II) is as a rule 60 to 100 mol %, preferably 90 to 100 mol %, in particular 95 to 100 mol %, based on the total monomer content of the electrolyte.

Suitable comonomers for the compounds of the formula (I) and of the formula (II) are preferably the compounds of the formulae (IV) and (V).

In the formula (IV):

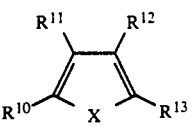

$R^{11}$ and $R^{12}$ are, independently of one another, a hydrogen atom, a halogen atom, a $(C_1-C_{12})$-, preferably a $(C_1-C_4)$-alkyl group, an alkoxyalkyl group, preferably alkoxymethyl, an arylmethyl group, preferably benzyl or thienylmethyl, an aryl group, preferably phenyl or thienyl, or they form together with the carbon atoms joining them an aromatic ring, preferably a benzene, thiophene or pyrrole ring.

$R^{10}$ and $R^{13}$ are, independently of one another, a hydrogen atom or they each form with $R^{11}$ or $R^{12}$ together with the carbon atoms joining them an aromatic ring, preferably a benzene, thiophene or pyrrole ring.

X is an oxygen atom, a sulfur atom, an NH group, an N-alkyl group, preferably N-$(C_1-C_4)$alkyl, or an N-aryl group, preferably N-phenyl.

Pyrrole, 3-chloropyrrole, 3-methylpyrrole, 3,4-dimethylpyrrole, N-methylpyrrole, thieno[3,2-b]pyrrole, carbazole, thiophene, 3-methylthiophene, 3-octylthiophene, 3,4-dimethylthiophene, 3,4-diethylthiophene, 3-(methoxyethoxymethyl)thiophene, 3-(methoxyethoxyethoxymethyl)thiophene, thieno[2,3-b]thiophene, dithieno[3,2-b;2',3'-d]thiophene, dibenzothiophene and isothionaphthene are suitable. The proportion of these comonomers is as a rule 0 to 40 mol%, preferably less than 10 mol%, based on the total monomer content of the electrolyte.

Furthermore, to modify the terminal groups of the poly(alkoxythiophenes), compounds having the formula (V):

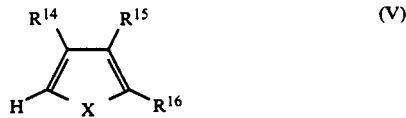

can be added to the compounds of the formula (I) or (II). $R^{14}$ and $R^{15}$ are, independently of one another, a hydrogen atom, a halogen atom, preferably chlorine or bromine, a $(C_1-C_{12})$-, preferably $(C_1-C_4)$alkyl group, a $(C_1-C_{30})$-, preferably a $(C_1-C_{12})$alkoxy group or a $(C_1-C_4)$acylamino group, preferably acetylamino.

$R^{16}$ is a halogen atom, preferably chlorine or bromine, a $(C_1-C_{12})$-, preferably a $(C_1-C_4)$alkyl group, a $(C_1-C_{30})$-, preferably a $(C_1-C_{12})$alkoxy group, or a $(C_1-C_4)$acylamino group, preferably acetylamino.

X has the meaning specified above.

Examples of compounds of the formula (IV) are: 2-bromothiophene, 2-chlorothiophene, 2-methylthiophene, 2-dodecylthiophene, 2-methoxythiophene, 2-hexyloxythiophene, 2-dodecyloxythiophene,2-acetylaminothiophene, 2-bromo-3-methoxythiophene, 2-bromo-4-methoxythiophene, 2-chloro-3-methylthiophene, 2,3-dimethylthiophene, 2,4-dimethylthiophene, 2,3-dimethoxythiophene,2,4-dimethoxythiophene, 3-methoxy-2-methylthiophene, 3-hexyloxy-2-methylthiophene, 2-methoxy-3-methylthiophene, 4-methoxy-2-methylthiophene, 2-acetylamino-3-methoxythiophene, 2-acetylamino-4-methoxythiophene, 2,3,4-trimethylthiophene, 3,4-dimethyl-2-methoxythiophene, 2,4-dimethyl-3-methoxythiophene, 3,4-dimethyl-2-dodecyloxythiophene, 3,4-dimethoxy-2-methylthiophene, 2,3,4-trimethoxythiophene, 2-bromopyrrole, 2-chloropyrrole, 2-chloro-3-methylpyrrole, 2-bromo-3,4-dimethylpyrrole, 2-methylfuran, 2-methoxyfuran, 2,3,4-trimethylfuran. Owing to the substitution in position 2, the compounds of the formula (IV) have a chain-stopping action. Their proportion is as a rule 0 to 40 mol%, preferably less than 10 mol%, based on the total monomer content of the electrolyte. The above comonomers of the formulae (IV) and (V) can also be used as mixtures.

The preparation of the compounds of the formula (I), (II), (IV) and (V) is known from the prior art. The monomer concentration is 0.01 to 5 mol, preferably 0.05 to 1 mol of monomer per $dm^3$ of electrolyte solvent.

The electrochemical polymerization of the monomers or of the monomer mixtures is carried out in one of the standard electrolyte/solvent systems, which must be stable under the conditions of the electrochemical polymerization and must have an adequate solubility for monomer and conducting salt. Preferably, dipolar aprotic solvents such as, for example, acetonitrile, benzonitrile, propylene carbonate, nitromethane and sulfur dioxide and also mixtures of said solvents, optionally also with other solvents which are stable under the conditions of the electrochemical polymerization such as, for example, dimethylformamide, N-methylpyrrolidinone, dimethyl sulfoxide, methylene chloride and tetrahydrofuran are used.

As conducting salts which provide charge transport during the electrochemical polymerization and whose anions are incorporated in the polymers and may affect their properties such as thermal stability, solubility and electrical conductivity, use is made of compounds which are standard per se. Mention may be made here, for example, of tetrafluoroborates, hexafluorophosphates, hexafluoroarsenates, hexafluoroantimonates, hexachloroantimonates, perfluoroalkylsulfonates, p-toluene sulfonates and perchlorates. In this connection, tetrafluoroborates, hexafluorophosphates and trifluoromethanesulfonates are preferred. Mixtures of these conducting salts may also be used.

Suitable cations for the conducting salts are, in addition to the alkaline-earth-metal cations, preferably the alkali-metal cations, in particular $Li^+$ and $Na^+$. Cations of the type $R_4N^+$ or $R_4P^+$ in which the radicals R are each, independently of one another, hydrogen, $(C_1-C_{12})$alkyl radicals, cycloaliphatic or aromatic radicals have also proved to be suitable.

Particularly preferred conducting salts are lithium tetrafluoroborate and sodium tetrafluoroborate. The amount of conducting salt is 0.01 mol to 1 mol, preferably 0.05 to 0.5 mol per dm: of solvent, and as a maximum it is equivalent to the saturation concentration.

Essential for the process according to the invention for the electrochemical production of poly(alkoxythiophenes) is the presence of a proton source in the form of at least one monomeric or polymeric carboxylic acid whose anions differ from the anions of the conducting salt and which preferably has a $pK_a$ of 0 to 2, in particular of 0 to 1, in addition to a conducting salt in the electrolyte solvent.

The carboxylic acid is preferably an unsubstituted or substituted straight-chain, branched aliphatic, alicyclic, unsaturated, aromatic or arylaliphatic carboxylic acid, for example a $(C_1-C_{12})$-, preferably a $(C_1-C_4)$alkylcarboxylic acid, a $(C_1-C_{12})$-$\alpha$-haloalkylcarboxylic acid, preferably $(C_1-C_4)$-$\alpha$-chloroalkylcarboxylic acid, a $(C_1-C_{12})$-$\alpha$-dihaloalkylcarboxylic acid, preferably a $(C_1-C_4)$-$\alpha\theta$-dichloroalkylcarboxylic acid, a $(C_1-C_{12})$perhaloalkylcarboxylic acid, preferably a $(C_1-C_4)$perchloroalkylcarboxylic acid or $(C_1-C_4)$perfluoroalkylcarboxylic acid, an ethercarboxylic acid of the type $CH_3O(CH_2CH_2O)_lCH_2COOH$, where l = zero to 4, a perfluoroalkylethercarboxylic acid of the type $CF_3CF_2(CF_2OCF(CF_3)_2)_rCOOH$, where r = 1 to 4, a $(C_3-C_{12})$alkenecarboxylic acid, a $(C_3-C_{12})$alkynecarboxylic acid, an unsubstituted or substituted arylcarboxylic acid or a heteroarylcarboxylic acid, preferably monochloro-, dichloro- or trichlorobenzoic acid or monofluoro-, difluoro- or trifluorobenzoic acid, unsubstituted or substituted $(C_1-C_4)$arylalkylcarboxylic acid or $(C_1-C_4)$-heteroalkylcarboxylic acid. The carboxylic acid may also be an unsubstituted or substituted aliphatic, alicyclic, unsaturated or aromatic dicarboxylic acid, for example a $(C_2-C_{12})$alkyldicarboxylic acid, preferably a $(C_2-C_{12})$alkyldicarboxylic acid, a $(C_4-C_{12})$alkenedicarboxylic acid, a $(C_4-C_{12})$alkynedicarboxylic acid, an aryldicarboxylic acid or a heteroaryldicarboxylic acid, preferably benzenedicarboxylic acids. The carboxylic acid may also be an aliphatic, alicyclic or aromatic tri-, tetra-, penta- and hexacarboxylic acid. The carboxylic acid may also be an unsubstituted or substituted polymeric aliphatic, alicyclic, unsaturated, aromatic or arylaliphatic carboxylic acid.

As examples of carboxylic acids mention may be made here of: formic acid, acetic acid, propionic acid, butyric acid, isobutyric acid, pentanoic acid, hexanoic acid, octanoic acid, decanoic acid, dodecanoic acid, cyanoacetic acid, chloroacetic acid, 2-chlorobutyric acid, dichloroacetic acid, trichloroacetic acid, trifluoroacetic acid, perfluorooctanoic acid, methoxyacetic acid, (methoxyethoxy)acetic acid, 2-perfluoropropoxyperfluoropropionic acid, 2-(2'-perfluoropropoxyperfluoropropoxy)perfluoropropionic acid, cyclopropanecarboxylic acid, cyclopentanecarboxylic acid, cyclohexanecarboxylic acid, acrylic acid, metacrylic acid, propionic acid, benzoic acid, thiophenecarboxylic acid, pyridinecarboxylic acid, 4-chlorobenzoic acid, 3-chlorobenzoic acid, 2,4-dichlorobenzoic acid, 2,4,6-trichlorobenzoic acid, 4-fluorobenzoic acid, 3-fluorobenzoic acid, 5-chlorothiophene-2-carboxylic acid, 4-cyanobenzoic acid, 3-cyanobenzoic acid, phenylacetic acid, oxalic acid, malonic acid, succinic acid, glutaric acid, adipic acid, pimelic acid, dodecanedicarboxylic acid, maleic acid, fumaric acid, acetylenedicarboxylic acid, phthalic acid, isophthalic acid, terephthalic acid, trimellitic acid, polyacrylic acid, polyacrylic acid, polymethacrylic acid.

The amount of carboxylic acid is 0.002 to 5 mol, preferably 0.01 to 1 mol, per $dm^3$ of electrolyte solvent, at least, however, 20 eq-% of the amount of monomers used.

In addition to the carboxylic acid, water may also be added to the electrolyte in an amount of up to 5 mol, preferably up to 1 mol, and in particular up to 0.2 mol per $dm^3$ of electrolyte solvent.

The anode is composed of one of the standard materials which are stable under the conditions of the anodic polymerization, preferably of a noble metal, in particular of platinum and gold, or of carbon, in particular of vitreous carbon (pyrolytic carbon). It can be used in the form of plates, sheets or cylinders and is in general disposed in parallel with the cathode. If two cathodes are used, they are located at the same distance in front of and behind the anode. A variant is to choose an electrode structure which offers a large specific surface containing many cavities, for example net-type, fabric-type and felt-type structures made of noble metal or carbon fibers. Suitable anodes are, for example, hard and soft felt and also monolayer and multilayer fabrics made of carbon fibers.

In order to prevent a short circuit, the cathode may be separated from the anode by means of a spacer which is composed, for example, of an inert plastic gauze.

The electrochemical polymerization is carried out at a temperature which is between the solidification point and the boiling point of the electrolyte/solvent system and usually in the range from −60° to 80° C., preferably −30° to 50° C. The highest yields are achieved at a temperature of −20° to 40° C.

The duration of the electrolysis depends on the electrolyte system used, the particular electrolysis conditions and in particular the amount of monomers used. Normally the electrolysis time is 1 to 12 hours, preferably 2 to 8 hours.

The electrochemical polymerization can be carried out in the standard cells or electrolysis apparatuses. Well suited are, for example, simple electrolysis apparatuses comprising an undivided cell, two or more electrodes and an external current and voltage supply source. However, divided cells containing diaphragms or ion exchange membranes or those containing reference electrodes for the exact determination of the potential may also be used. It is expedient to measure the current consumption since this makes it possible to estimate the amount of monomer already used. An electrolytic apparatus in which the cathode is of laminar construction at the base and the anode is conveyed in the form of a strip with constant advance through the electrolyte makes it possible to conduct a process continuously.

Any direct current voltage source which delivers a sufficiently high electrical voltage is suitable as current and voltage source for operating the electrolytic cell in which the process according to the invention is carried out. Normally, the electrochemical polymerization is operated with a voltage of 0.1 to 100 volts, preferably in the range from 1.5 to 30 volts. Values in the range from 0.0002 to 50 mA/cm$^2$, preferably in the range from 0.001 to 10 mA/cm$^2$ of specific anode surface have proved to be beneficial and advantageous for the current density.

In contrast to the electrolyses without acid added (comparison examples), the formation of cathode scales is prevented, or at least reduced, by the addition according to the invention of a carboxylic acid and the increase in the terminal voltage during the electrolysis at constant current is markedly reduced even if the preferred alkali tetrafluoroborates are used as conducting salt.

For the purpose of isolation and purification, the poly(alkoxythiophenes) are mechanically separated from the anode or by filtering out of the electrolyte. Soluble poly(alkoxythiophenes) may also be stripped with a suitable solvent from the anode and obtained after the solvent has evaporated. The further purification of the crude products and the removal of the conducting salts, monomers and other adhering impurities is carried out by washing with solvents in which the polymers are insoluble, such as water, methanol, ethanol, petroleum ether, pentane, cyclohexane and, optionally, acetonitrile or dichloromethane. Yields of about 50 to 80% are possible by the process according to the invention.

More than 90 mol %, preferably more than 95 mol % and, in particular, more than 99 mol % of the anions which are incorporated in the doped poly(alkoxythiophenes) obtained originate from the conducting salt and less than 10 mol %, preferably less than 5 mol %, and in particular less than 1 mol % from the carboxylic acid.

The electrical conductivity of the doped polymers produced by the process according to the invention, in particular with the addition of carboxylic acids having a pK$_a$ of 0 to 1, is higher than that of polymers obtained under comparable conditions without acid being added.

Since the liberation of hydrogen is guaranteed as preferred cathode reaction by adding the carboxylic acid even at high conversions, no appreciable cathodic decomposition of conducting salt and solvent occurs. The electrolyte solvent, the excess of carboxylic acid and the excess of the conducting salt not incorporated in the conducting polymer can therefore be recovered from the electrolyte and used again.

The invention is explained in more detail by the following examples. The percentages specified in the examples relate, unless otherwise noted, to the weight. The specific conductivity was determined by means of a four-point measurement on moldings. The molecular weight distribution of the soluble polymers was determined by means of gel permeation chromatography (GPC) on the neutral (undoped) form which was obtained, for example, by electrochemical reduction at a platinum cathode at −0.3 V referred to an aqueous Ag/AgCl reference electrode.

COMPARISON EXAMPLE A 11.0 g of sodium tetrafluoroborate, 22.8 g of 3-methoxythiophene and 1200 g of acetonitrile were added to a trough-shaped, undivided electrolysis cell. Disposed in the center of the cell was a water-cooled, stainless-steel hollow cathode having a length of 170 mm and a width of 170 mm. Located on either side at a distance of 2 cm in parallel with the cathode was in each case a carbon felt anode (weight per unit surface area 0.4 kg/m$^2$, specific surface (BET) approximately 1.5 m$^2$/g) having a length of 170 mm, a width of 170 mm and a thickness of 4 mm. A polypropylene gauze was in each case located as a spacer between the cathode and the anodes. With an electrolysis temperature of 20° C. and an anode current of 2A, the cell voltage rose during the electrolysis rapidly from 6.2 volts to over 30 volts as a consequence of the formation of cathode scale, with the result that the electrolysis had to be interrupted three times and the cathode had to cleaned. After the theoretical amount of current had been consumed, the electrolysis was terminated. After drying, the anodes loaded with crude product were placed in a bath containing acetonitrile and digested in it several times until the polymers had virtually completely gone into solution. The solution was filtered through a glass filter crucible of pore size G3 and the filtrate was evaporated to dryness in a rotary evaporator. The crude product was comminuted mechanically, washed with water, dried, digested with dichloromethane, then filtered off and dried. 6.8 g of a solid with a bronze-metallic lustre were obtained. A powder molding of the ground product had a specific conductivity of $4.4 \times 10^{-3}$ S/cm. The GPC of the undoped form revealed that more than 90% of the product was composed of pentamers and hexamers.

EXAMPLE 1

11.0 g of sodium tetrafluoroborate, 5.7 g of trifluoroacetic acid, 22.8 g of 3-methoxythiophene and 1200 g of acetonitrile were electrolyzed in an electrolysis cell in accordance with Comparison Example A. With an electrolysis temperature of 20° C. and an anode current of 2A, the cell voltage was 6.2 volts at the beginning of electrolysis and 8.0 volts towards the end of the electrolysis without the cathode having to be cleaned. After the theoretical amount of current had been consumed, the electrolysis was terminated. The working up was carried out in accordance with Comparison Example A. 11.9 g of a solid with a bronze-metallic lustre were obtained. A powder molding of the ground product had a specific conductivity of $1.4 \times 10^{-2}$ S/cm. The GPC of the undoped form revealed that more than 90% of the product was composed of pentamers and hexamers.

COMPARISON EXAMPLE B 22.0 g of sodium tetrafluoroborate, 48.6 g of a 60%-strength aqueous hexafluorophosphoric acid, 45.6 g of 3-methoxythiophene and 2500 g of acetonitrile were added to a trough-shaped, undivided electrolysis cell. In the center of the cell was a polyethylene partition. In both parts of the cell, a stainless-steel cathode having a length of 170 mm and a width of 170 mm was disposed in the center. A carbon felt anode (weight per unit area 0.4 kg/m$^2$, specific surface (BET) approximately 1.5 m$^2$/g) having a length of 170 mm, a width of 170 mm and a thickness of 4 mm was in each case located on either side at a distance of 2 cm parallel to the cathode. A polypropylene gauze was located as a spacer in each case between the cathode and the anode. With an electrolysis temperature of 20° C. and an anode current of 4A, the cell voltage was 3.0 volts at the beginning of the electrolysis and 10.5 volts towards the end of the electrolysis. After the theoretical amount of current had been consumed, the electrolysis was terminated. The working-up was carried out in accordance with Comparison Example A. 10.6 g of a solid with a bronze-metallic lustre were obtained. A powder molding of the ground product had a specific conductivity of $1.4 \times 10^{-3}$ S/cm. It was possible to detect tetrafluoroborate and hexafluorophosphate as counterions in the $^{19}$F NMR spectrum of the doped polymer. $^{19}$F-NMR (94.2 MHz, DMSO): δ= −147.7 (s), (BF$_4^-$); −72.0 (d, 718 Hz) (PF$_6^-$).

EXAMPLE 2

22.0 g of sodium tetrafluoroborate, 22.8 g of trifluoroacetic acid, 45.6 g of 3-methoxythiophene and 2500 g of acetonitrile were electrolyzed in an electrolysis cell in accordance with Comparison Example B. With an electrolysis temperature of 20° C. and an anode current of 4A, the cell voltage was 5 volts at the beginning of the electrolysis and 9 volts towards the end of the electrolysis, without the cathode having to be cleaned. After the theoretical amount of current had been consumed, the electrolysis was terminated. The working-up was carried out in accordance with Comparison Example A. 20.0 g of a solid with a bronze-metallic lustre were obtained. A powder molding of the ground product had a specific conductivity of $8.4 \times 10^{-3}$ S/cm. It was possible to detect tetrafluoroborate but no trifluoroacetate as counterion in the $^{19}$F NMR spectrum of the doped polymer. $^{19}$F-NMR (94.2 MHz, DMSO): δ= −147.7 (s), (BF$_4^-$).

EXAMPLE 3

22.0 g of sodium tetrafluoroborate, 32.7 g of trichloroacetic acid, 45.6 g of 3-methoxythiophene and 2500 g of acetonitrile were electrolyzed in an electrolysis cell in accordance with Comparison Example B. With an electrolysis temperature of 20° C. and an anode current of 4A, the cell voltage was 3.1 volts at the beginning of the electrolysis and 12 volts towards the end of the electrolysis, without the cathode having to be cleaned. After the theoretical amount of current had been consumed, the electrolysis was terminated. The working-up was carried out in accordance with Comparison Example A. 12.7 g of a solid with a bronze-metallic lustre were obtained. A powder molding of the ground product had a specific conductivity of $7.5 \times 10^{-3}$ S/cm.

EXAMPLE 4

22.0 g of sodium tetrafluoroborate, 25.8 g of dichloroacetic acid, 45.6 g of 3-methoxythiophene and 2500 g of acetonitrile were electrolyzed in an electrolysis cell in accordance with Comparison Example B. With an electrolysis temperature of 20° C. and an anode current of 4A, the cell voltage was 5 volts at the beginning of the electrolysis and 17 volts towards the end of the electrolysis, without the cathode having to be cleaned. After the theoretical amount of current had been consumed, the electrolysis was terminated. The working-up was carried out in accordance with Comparison Example A. 14.9 g of a solid with a bronze-metallic lustre were obtained. A powder molding of the ground product had a specific conductivity of $5.0 \times 10^{-3}$ S/cm.

EXAMPLE 5

22.0 g of sodium tetrafluoroborate, 18.9 g of chloroacetic acid, 45.6 g of 3-methoxythiophene and 2500 g of acetonitrile were electrolyzed in an electrolysis cell in accordance with Comparison Example B. With an electrolysis temperature of 20° C. and an anode current of 4A, the cell voltage was 17 volts at the beginning of the electrolysis and 17 volts towards the end of the electrolysis, without the cathode having to be cleaned. After the theoretical amount of current had been consumed, the electrolysis was terminated. The working-up was carried out in accordance with Comparison Example A. 14.8 g of a solid with a bronze-metallic lustre were obtained. A powder molding of the ground product had a specific conductivity of $4.0 \times 10^{-3}$ S/cm.

EXAMPLE 6

22.0 g of sodium tetrafluoroborate, 9.2 g of formic acid, 45.6 g of 3-methoxythiophene and 2500 g of acetonitrile were electrolyzed in an electrolysis cell in accordance with Comparison Example B. With an electrolysis temperature of 20° C. and an anode current of 4A, the cell voltage was 7 volts at the beginning of the electrolysis and 16 volts towards the end of the electrolysis, without the cathode having to be cleaned. After the theoretical amount of current had been consumed, the electrolysis was terminated. The working-up was carried out in accordance with Comparison Example A. 15.5 g of a solid with a bronze-metallic lustre were obtained. A powder molding of the ground product had a specific conductivity of $4.1 \times 10^{-3}$ S/cm.

EXAMPLE 7

22.0 g of sodium tetrafluoroborate, 31.3 g of 4-chlorobenzoic acid, 45.6 g of 3-methoxythiophene and 2500 g of acetonitrile were electrolyzed in an electrolysis cell in accordance with Comparison Example B. With an electrolysis temperature of 20° C. and an anode current of 4A, the cell voltage was 22.5 volts at the beginning of the electrolysis and 15 volts towards the end of the electrolysis, without the cathode having to be cleaned. After the theoretical amount of current had been consumed, the electrolysis was terminated. The working-up was carried out in accordance with Comparison Example A. 6.6 g of a solid with a bronze-metallic lustre were obtained. A powder molding of the ground product had a specific conductivity of $7.4 \times 10^{-3}$ S/cm.

EXAMPLE 8

11.0 g of sodium tetrafluoroborate, 11.4 g of trifluoroacetic acid, 25.6 g of 3-ethoxythiophene and 1200 g of acetonitrile were electrolyzed in an electrolysis cell in accordance with Comparison Example A. With an electrolysis temperature of 20° C. and an anode current of 2A, the cell voltage was 5.3 volts at the beginning of the electrolysis and 6.2 volts towards the end of the electrolysis, without the cathode having to be cleaned. After the theoretical amount of current had been consumed, the electrolysis was terminated. The working-up was carried out in accordance with Comparison Example A. 4.5 g of a solid with a bronze-metallic lustre were obtained. A powder molding of the ground product had a specific conductivity of $2.3 \times 10^{-2}$ S/cm.

COMPARISON EXAMPLE C 11.0 g of sodium tetrafluoroborate, 26.8 g of 3-dodecyloxythiophene and 1200 g of acetonitrile were added to a trough-shaped, undivided electrolysis cell. Disposed in the center of the cell was a water-cooled, stainless-steel hollow cathode having a length of 170 mm and a width of 170 mm. Located on either side at a distance of 2 cm parallel to the cathode was in each case an anode having a length of 170 mm and a width of 170 mm made out of an 8-layer gauze composed of platinum/rhodium (95:5) wire having a diameter of 0.07 mm. A polypropylene gauze was in each case located between the cathode and the anodes as a spacer. With an electrolysis temperature of 20° C. and an anode current of 1A, the cell voltage rose during the electrolysis from 13 volts to over 70 volts as a consequence of the formation of a cathode scale, with the result that the electrolysis had to be interrupted and the cathode had to be cleaned. After the theoretical amount of current had been consumed, the electrolysis was terminated. After drying, the anodes loaded with the crude product were placed in a bath containing dichloromethane and digested in it several times until the polymer had virtually gone into solution completely. The solution was filtered through a glass filter crucible of pore size G3 and the filtrate was evaporated to dryness in a rotary evaporator. The crude product was comminuted mechanically, digested with acetonitrile and hexane, then filtered off and dried at 100° C. in an oil-pump vacuum. 6.6 g of a solid with a bronze-metallic lustre were obtained. A powder molding of the ground product had a specific conductivity of $7.4 \times 10^{-3}$ S/cm. The GPC of the undoped form revealed a mean molar mass of approximately 5400.

EXAMPLE 9

11.0 g of sodium tetrafluoroborate, 11.4 g of trifluoroacetic acid, 26.8 g of 3-dodecyloxythiophene and 1200 g of acetonitrile were electrolyzed in an electrolysis cell in accordance with Comparison Example C. With an electrolysis temperature of 20° C. and an anode current of 1A, the cell voltage was 4.8 volts at the beginning of the electrolysis and 7.0 volts towards the end of the electrolysis without the cathode having to be cleaned. After the theoretical amount of current had been consumed, the electrolysis was terminated. The working-up was carried out in accordance with Comparison Example C. 10.5 g of a solid with a bluish black lustre were obtained. A powder molding of the ground product had a specific conductivity of $1.7 \times 10^{-2}$ S/cm. The GPC of the undoped form revealed a mean molar mass of approximately 5400. It was possible to detect tetrafluoroborate but no trifluoroacetate as counterion in the $^{19}$F NMR of the doped polymer.

COMPARISON EXAMPLE D 22.0 g of sodium tetrafluoroborate, 12.0 g of trifluoromethanesulfonic acid or 1.44 g of water, 45.6 g of 3-methoxythiophene and 2500 g of acetonitrile were electrolyzed in an electrolysis cell in accordance with Comparison Example A. With an electrolysis temperature of 20° C. and an anode current of 4A, the cell voltage was 5.0 volts at the beginning of the electrolysis and 21.5 volts towards the end of the electrolysis without the cathode having to be cleaned. After the theoretical amount of current had been consumed, the electrolysis was terminated. The working-up was carried out in accordance with Comparison Example A. 18.3 g of a solid with a bronze-metallic lustre were obtained. A powder molding of the ground product had a specific conductivity of $3.9 \times 10^{-3}$ S/cm. It was possible to detect tetrafluoroborate and trifluoromethanesulfonate as counterion in the $^{19}$F NMR spectrum of the doped polymer. $^{19}$F NMR (94.2 MHz, DMSO): $\delta = -147.7$ (s), (BF$_4^-$), $-77.2$ (s), (CF$_3$SO$_3^-$).

EXAMPLE 10

22.0 g of sodium tetrafluoroborate, 22.8 g of trifluoroacetic acid, 45.6 g of 3-methoxythiophene and 2500 g of acetonitrile were electrolyzed in an electrolysis cell in accordance with Comparison Example B. With an electrolysis temperature of 10° C. and an anode current of 4A, the cell voltage was 5 volts at the beginning of the electrolysis and 6.6 volts towards the end of the electrolysis without the cathode having to be cleaned. After the theoretical amount of current had been consumed, the electrolysis was terminated. The working-up was carried out in accordance with Comparison Example A. 19.9 g of a solid with a bronze-metallic lustre were obtained. A powder molding of the ground product had a specific conductivity of $1.1 \times 10^{-2}$ S/cm.

I claim:

1. A process for the production of an electrically conducting poly(alkoxythiophene) in the doped or oxidized form comprising electrochemical anodic polymerization or doping of compounds of the formula (I):

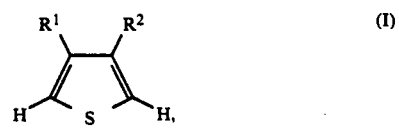

in which $R^1$ is a straight-chain or branched $(C_1-C_{30})$alkoxy group or $-O(CH_2CH_2O)_nCH_3$ where $n=1$ to 4, and $R^2$ is a hydrogen atom, a $(C_1-C_{12})$alkyl group, a $(C_1-C_{30})$-alkoxy group or $-O(CH_2CH_2O)_nCH_3$ where $n=1$ to 4, or $R^1$ and $R^2$ together form the radical $-O(CH_2)_mCH_2-$ or $-O(CH_2)_mO-$ where $m=1$ to 12, or compounds of the formula (II):

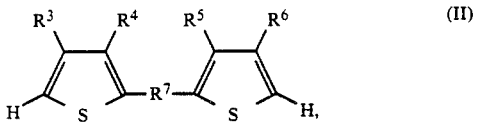

in which at least one of the radicals $R^3$, $R^4$, $R^5$ or $R^6$ is a straight-chain or branched $(C_1-C_{30})$alkoxy group or $-)(CH_2CH_2O)_nCH_3$ where $n=1$ to 4, and the remainder of the radicals $R^3$, $R^4$, $R^5$ and $R^6$ represent a hydrogen atom, a $(C_1-C_{12})$alkyl group or a $(C_1-C_{30})$alkoxy group, and $R^7$ is an arylene group, a heteroarylene group or a conjugated system of the formula $(CH=CH)_p$, in which p is zero, 1, 2 or 3, or $R^3$, $R^4$, $R^5$ and $R^6$ are, independently of one another, a hydrogen atom, a $(C_1-C_{12})$alkyl group or a $(C_1-C_{30})$-alkoxy group, or $R^7$ is a radical of the formula (III):

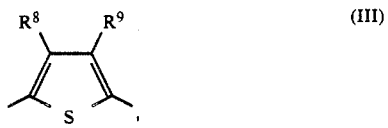

in which $R^8$ is a straight-chain or branched $(C_1-C_{30})$alkoxy group or $-O(CH_2CH_2O)_nCH_3$, where $n=1$ to 4, and $R^9$ is a hydrogen atom, a $(C_1-C_{12})$alkyl group or a $(C_1-C_{30})$alkoxy group, optionally polymerizing compounds of formula (I) or (II) together with one or more comonomers of the formula (IV)

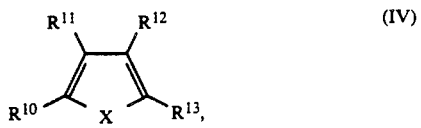

in which $R^{11}$ and $R^{12}$, independently of one another, are a hydrogen atom, a halogen atom, a $(C_1-C_{12})$alkyl, alkoxyalkyl, arylmethyl or aryl group or, together with the carbon atoms joining them, form an aromatic ring, $R^{10}$ and $R^{13}$, independently of one another, are a hydrogen atom or $R^{10}$ together with $R^{11}$ and the carbon atoms joining them or $R^{12}$ together with $R^{13}$ and the carbon atoms joining them each form an aromatic ring, X is an oxygen atom, a sulfur atom, an NH group, an N-alkyl group or an N-aryl group or together with a comonomer of the formula (V)

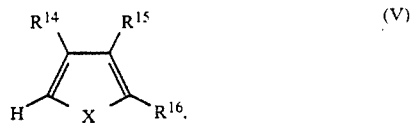

in which $R^{14}$ and $R^{15}$, independently of one another, are a hydrogen atom, a halogen atom, a $(C_1-C_{12})$alkyl group, a $(C_1-C_{30})$alkoxy group or a $(C_1-C_4)$acylamino group, $R^{16}$ is a halogen atom, a $(C_1-C_{12})$alkyl group, a $(C_1-C_{30})$alkoxy group or a $(C_1-C_4)$acylamino group, and X has the meaning specified above, in an electrolyte solvent in the presence of a conducting salt and additionally in the presence of a proton source in the form of at least one monomeric or polymeric carboxylic acid whose anions differ from the anions of the conducting salt, such that less than 10 mol % of any anions incorporated in the poly(alkoxythiophene) during the anodic polymerization and doping originate from the carboxylic acid, and more than 90 mol % originate from the conducting salt.

2. The process as claimed in claim 1, wherein a compound of the formula (I) specified above is used as monomer in an amount of 0.01 to 5 mol per $dm^3$ of electrolyte solvent, acetonitrile is used as electrolyte solvent, alkali-metal, alkaline-earth-metal or tetraalkylammonium tetrafluoroborate, hexafluorophosphate or trifluoromethanesulfonate is used as conducting salt in an amount of 0.01 to 1 mol per $dm^3$ of electrolyte solvent, as a maximum, however, in an amount which is equivalent to the saturation concentration, and a carboxylic acid having a $pK_a$ of 0 to 2 is used as proton source in an amount of 0.002 to 5 mol per $dm^3$ of electrolyte solvent, but at least in an amount of 20 eq-% of the amount of the monomer used.

3. The process as claimed in claim 1, wherein a monocarboxylic acid having a $pK_a$ of 0 to 1 is used as proton source.

4. The process as claimed in claim 1, wherein water in an amount of up to 5 mol per $dm^3$ of electrolyte solvent is used in addition to the carboxylic acid.

5. The process as claimed in claim 1, wherein $R^1$ in the formula (I) specified above is a $(C_1-C_{22})$alkoxy group and $R^2$ is a hydrogen atom.

6. The process as claimed in claim 1, wherein 3-methoxythiophene is used as monomer in an amount of 0.05 to 1 mol per $dm^3$ of electrolyte solvent, acetonitrile is used as electrolyte solvent, a lithium tetrafluoroborate or sodium tetrafluoroborate is used as conducting salt in an amount of 0.05 to 0.5 mol per $dm^3$ of electrolyte solvent, as a maximum, however, in an amount which is equivalent to the saturation concentration, and trifluoroacetic acid is used as proton source in an amount of 0.01 to 1 mol per $dm^3$ of electrolyte solvent, at least, however, in an amount of 20 eq-% of the amount of the monomer used, at an electrolysis temperature of $-20°$ to $40°$ C.

7. The process as claimed in claim 1, wherein less than 5 mol% of any anions incorporated in the poly(alkoxythiophene) during the anodic polymerization and doping originate from the carboxylic acid and more than 95 mol % originate from the conducting salt.

* * * * *